Figure 1:
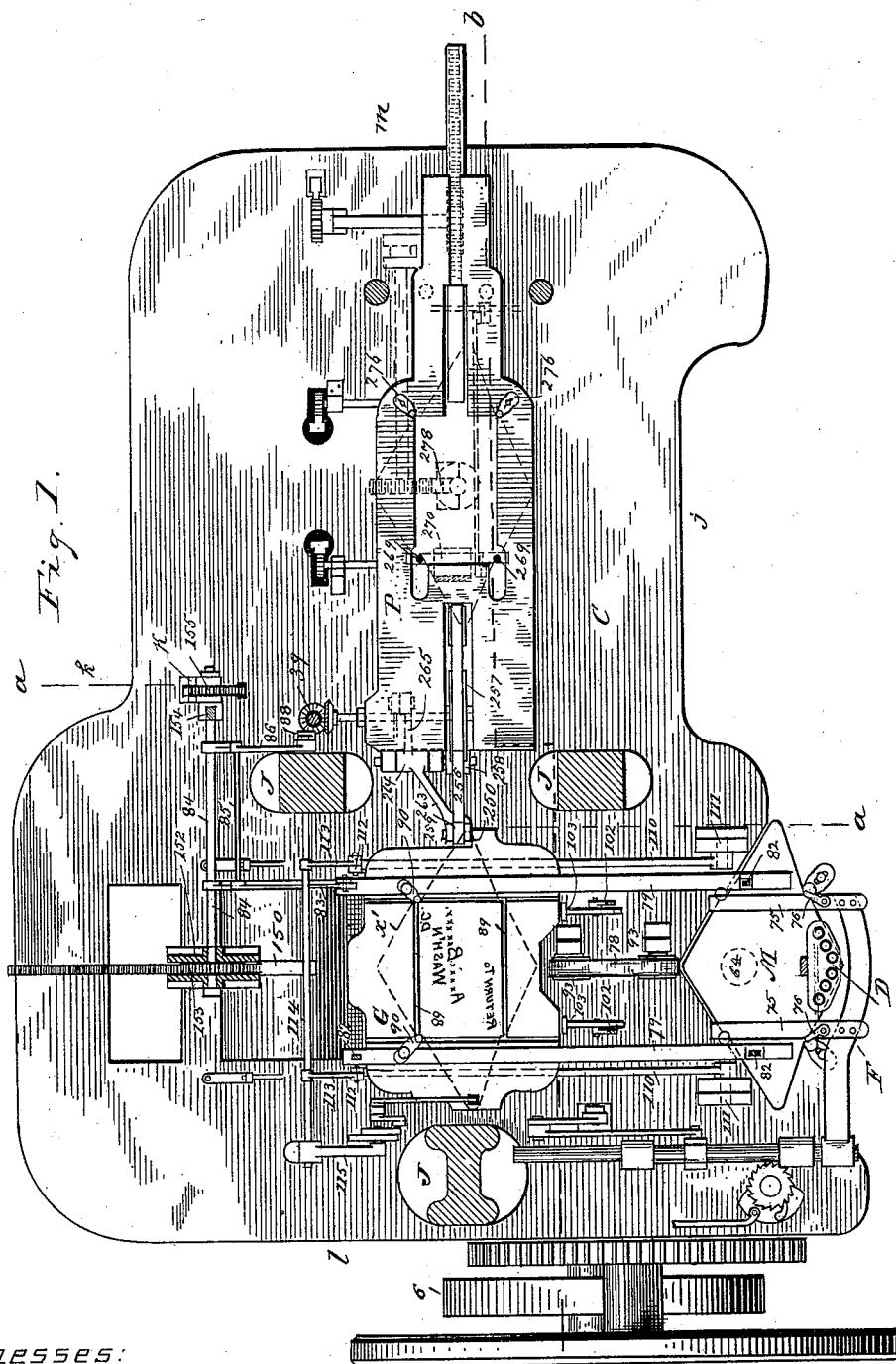

(No Model.) 10 Sheets—Sheet 1.
C. H. HEYWOOD.
MACHINE FOR MAKING AND PRINTING ENVELOPES.
No. 420,792. Patented Feb. 4, 1890.

Witnesses:
Wm. F. Bellows
J. N. Garfield

Inventor,
Chas. H. Heywood.

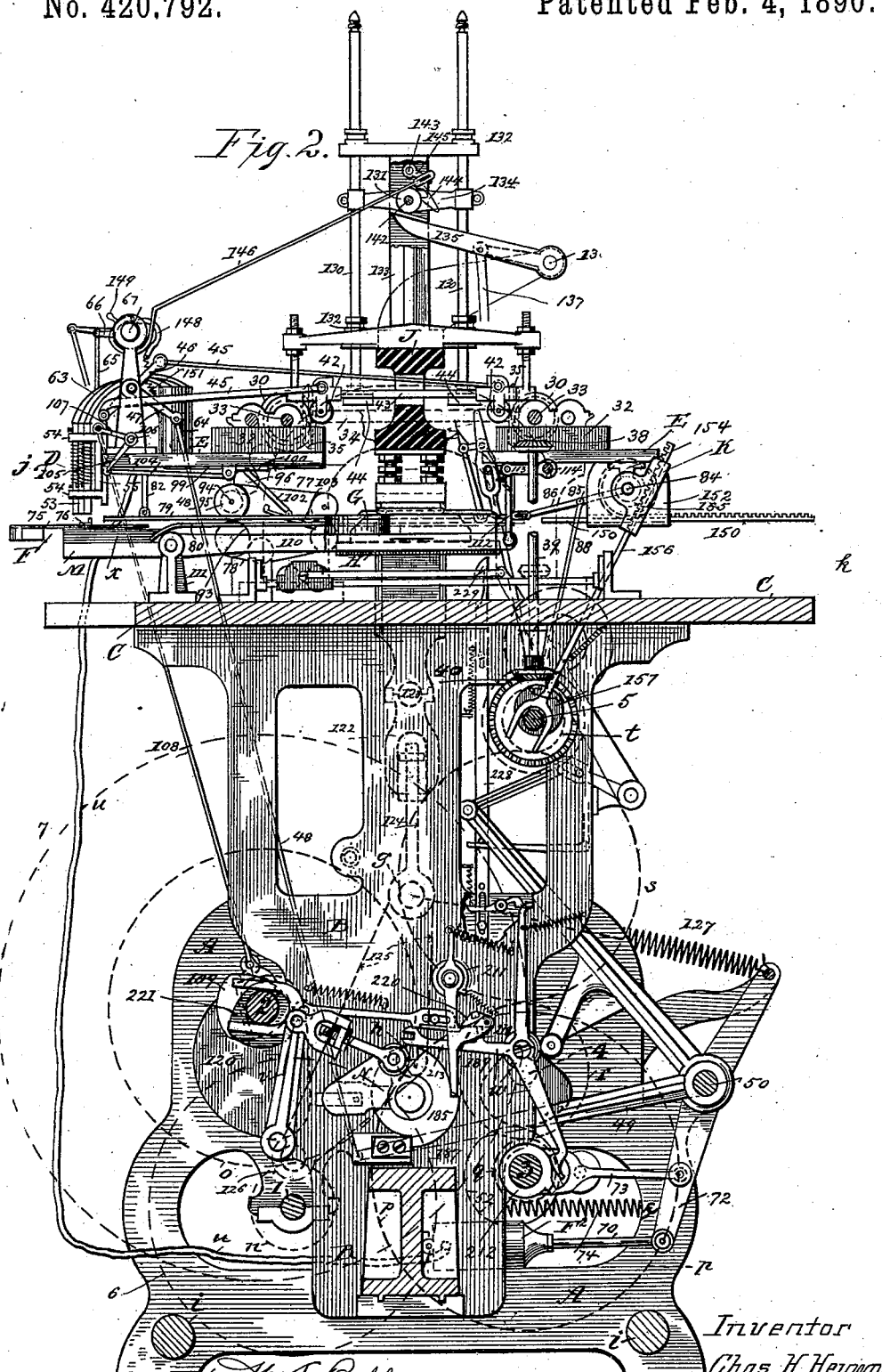

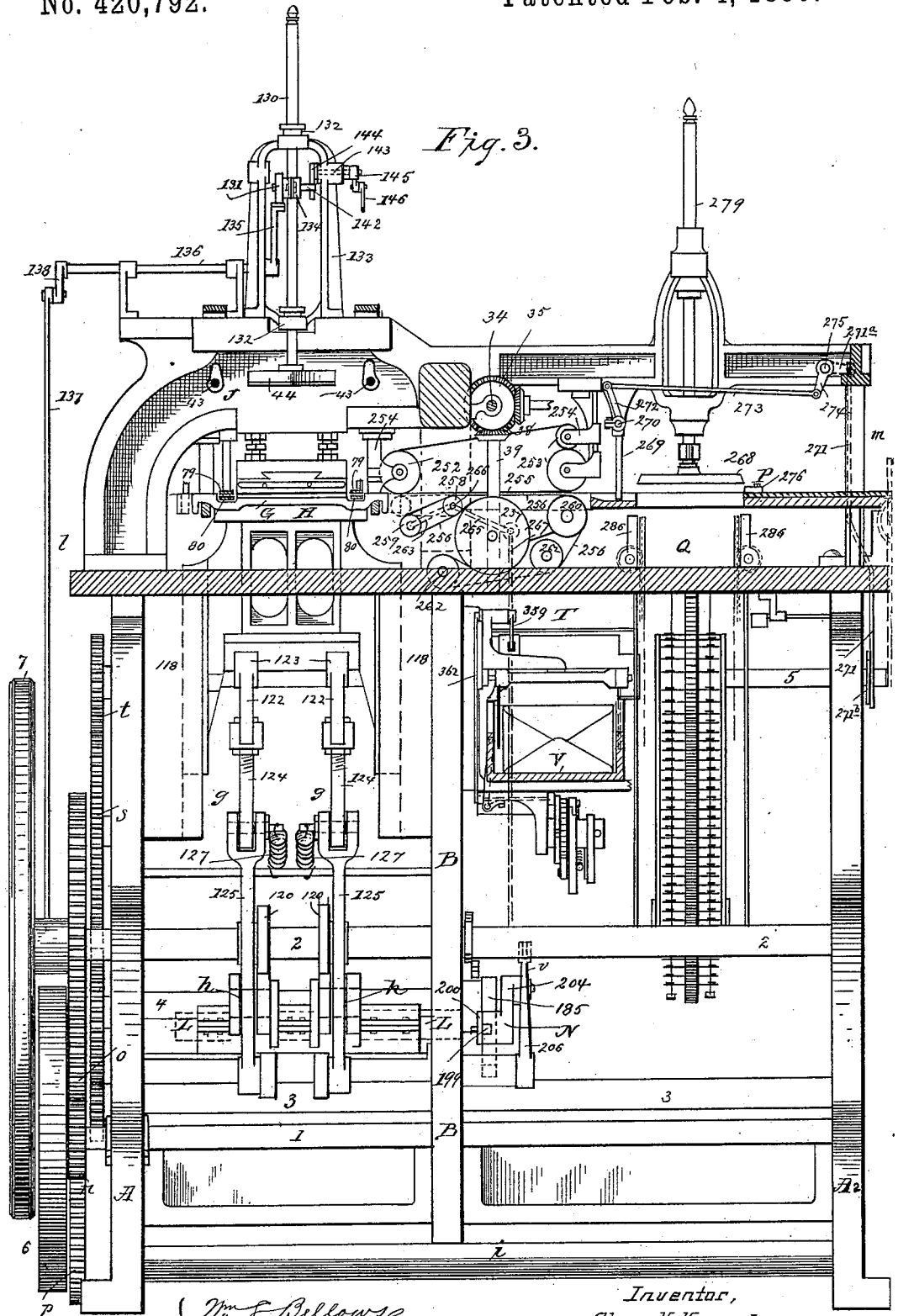

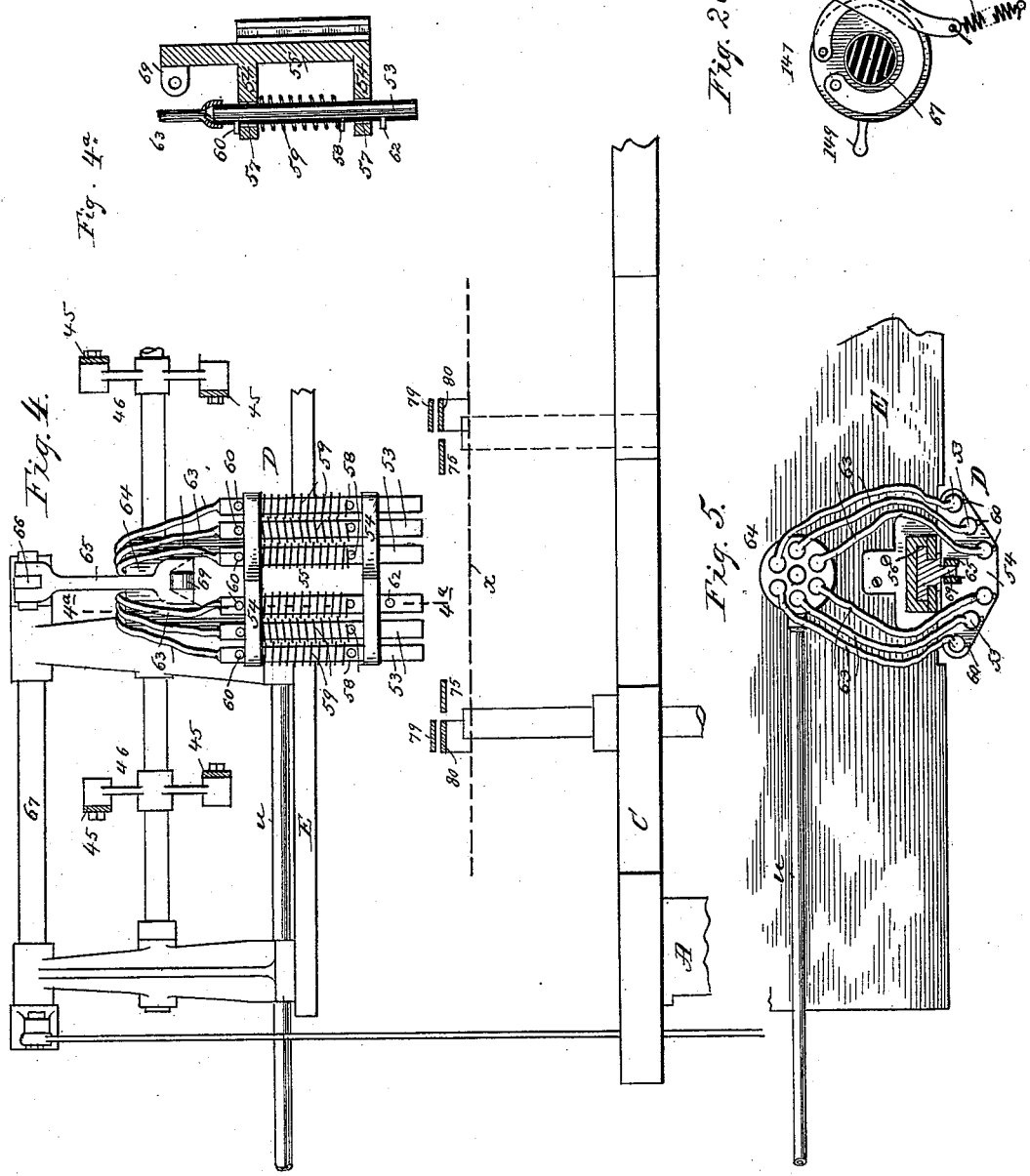

(No Model.) 10 Sheets—Sheet 5.
C. H. HEYWOOD.
MACHINE FOR MAKING AND PRINTING ENVELOPES.
No. 420,792. Patented Feb. 4, 1890.
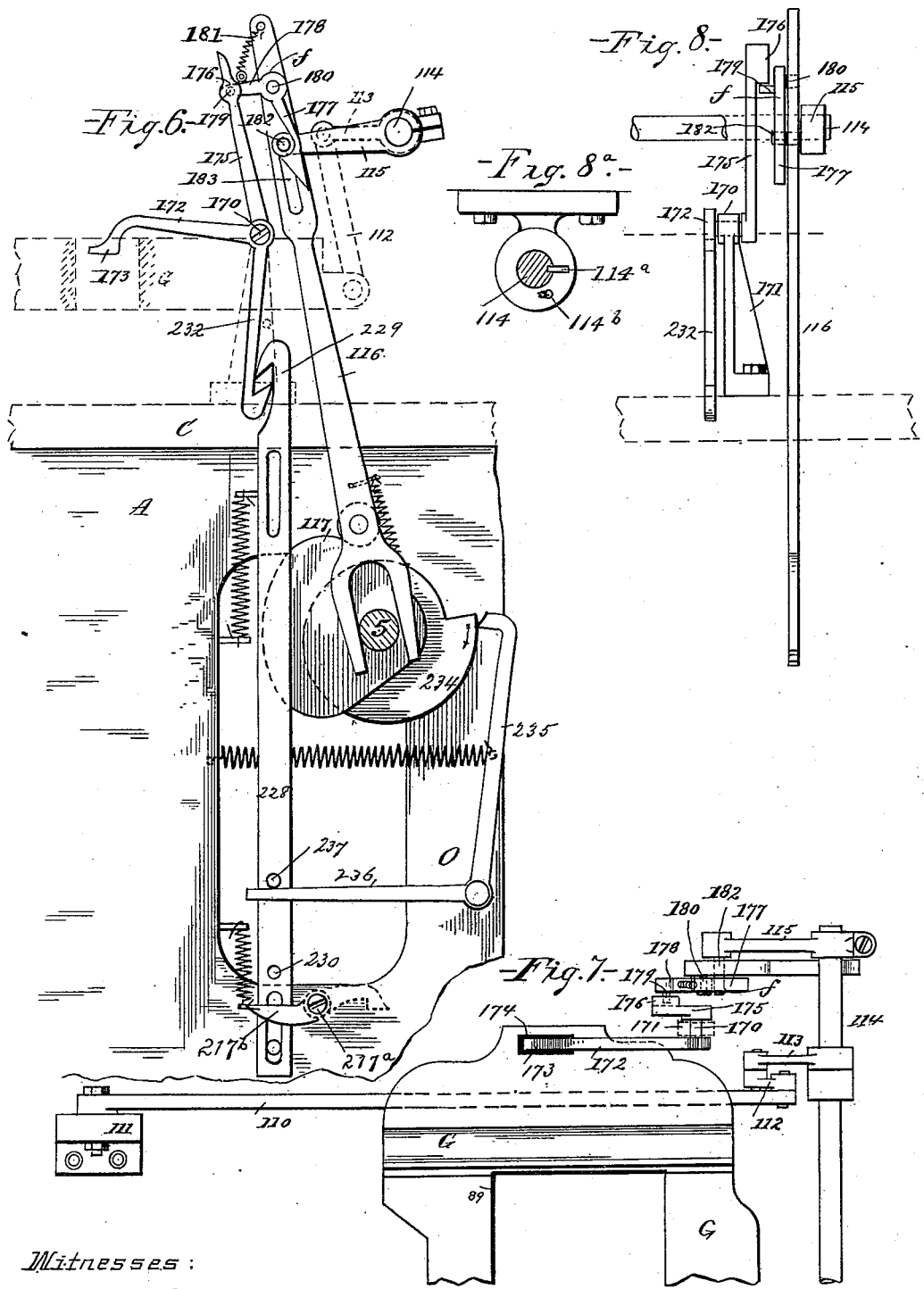
Witnesses:
Wm. F. Bellows
J. W. Garfield
Inventor,
Chas. H. Heywood
per
Attorneys.

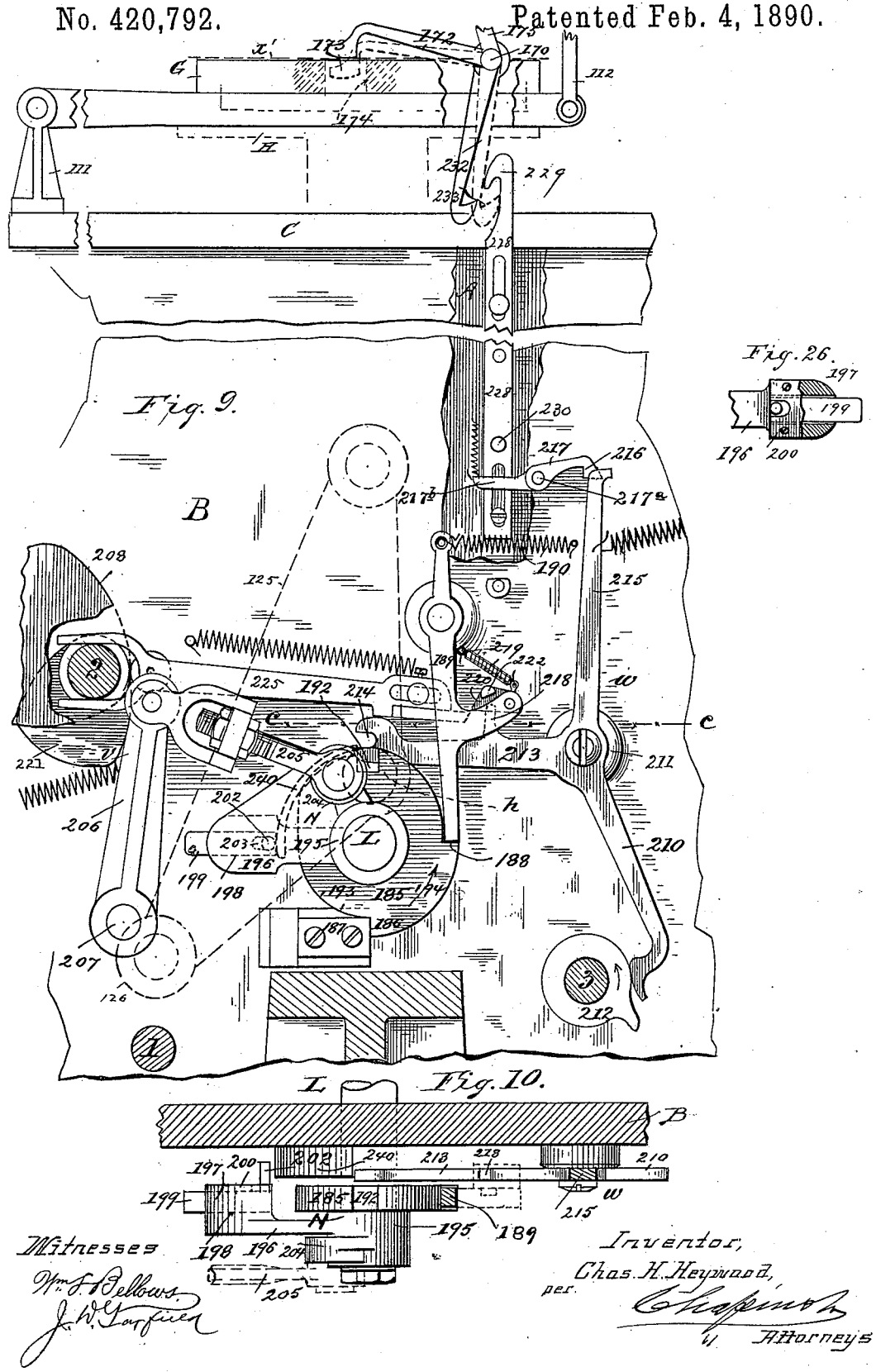

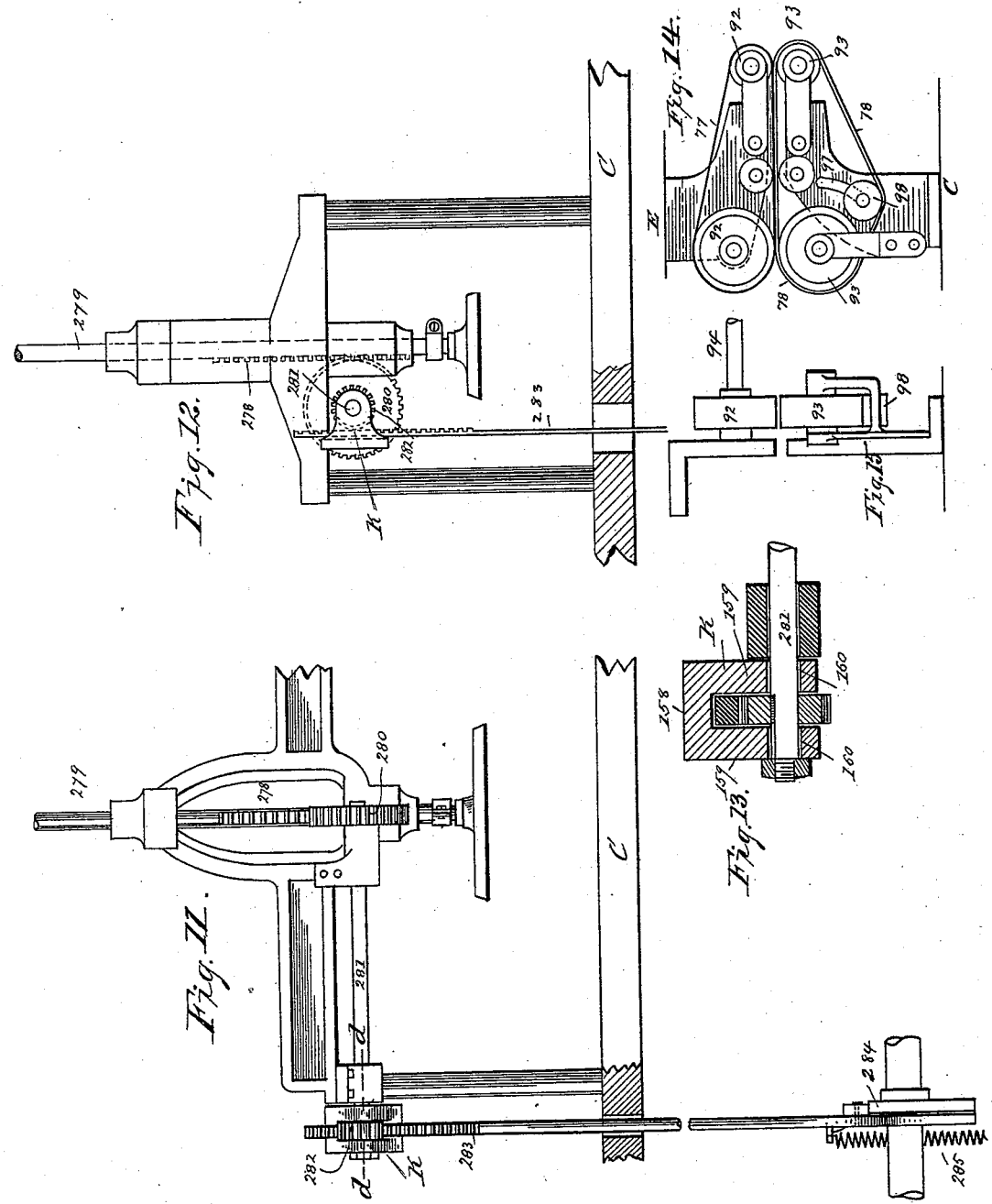

(No Model.) 10 Sheets—Sheet 8.
C. H. HEYWOOD.
MACHINE FOR MAKING AND PRINTING ENVELOPES.
No. 420,792. Patented Feb. 4, 1890.
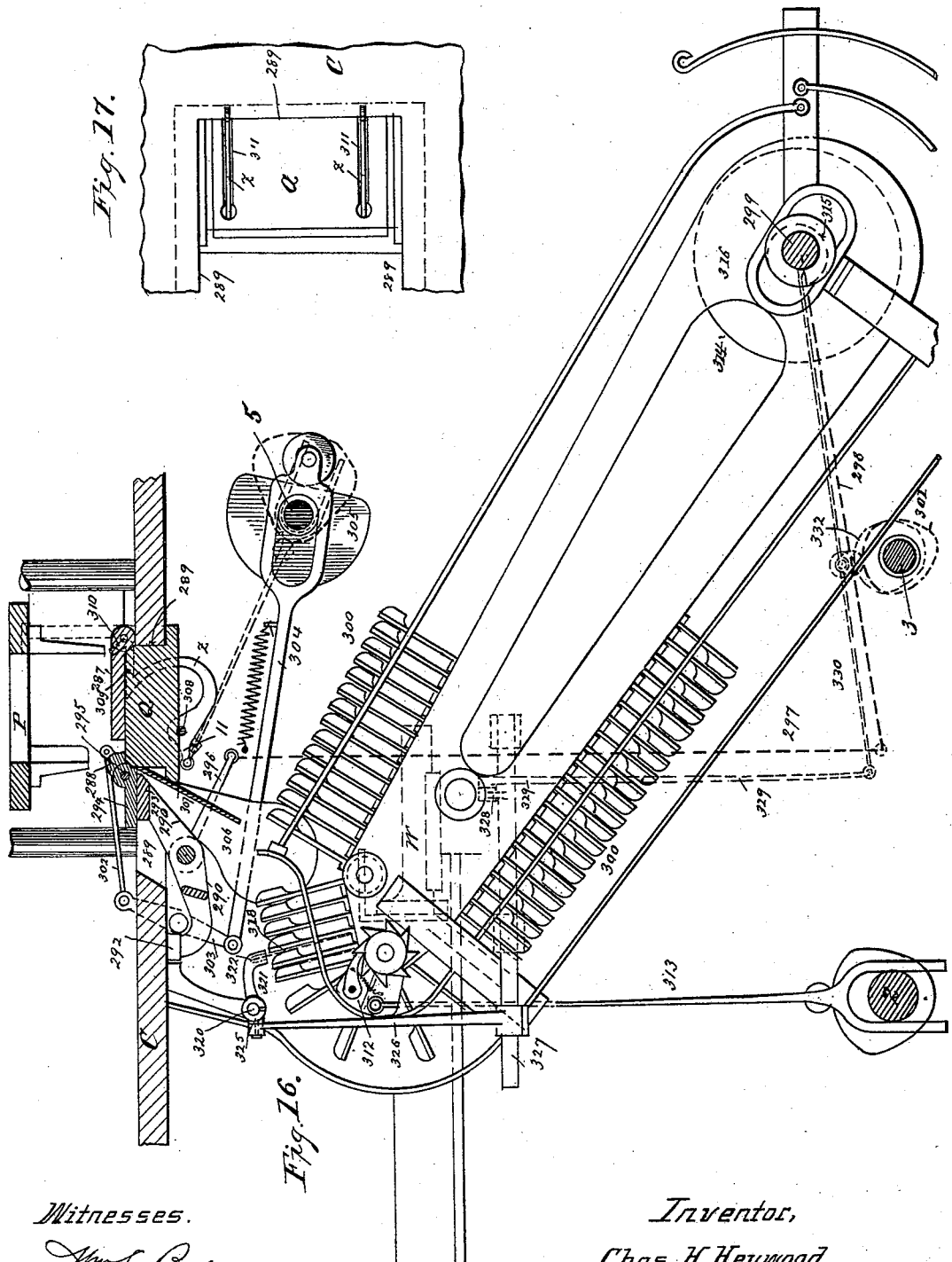
Witnesses.
Inventor,
Chas. H. Heywood,
per
Attorneys.

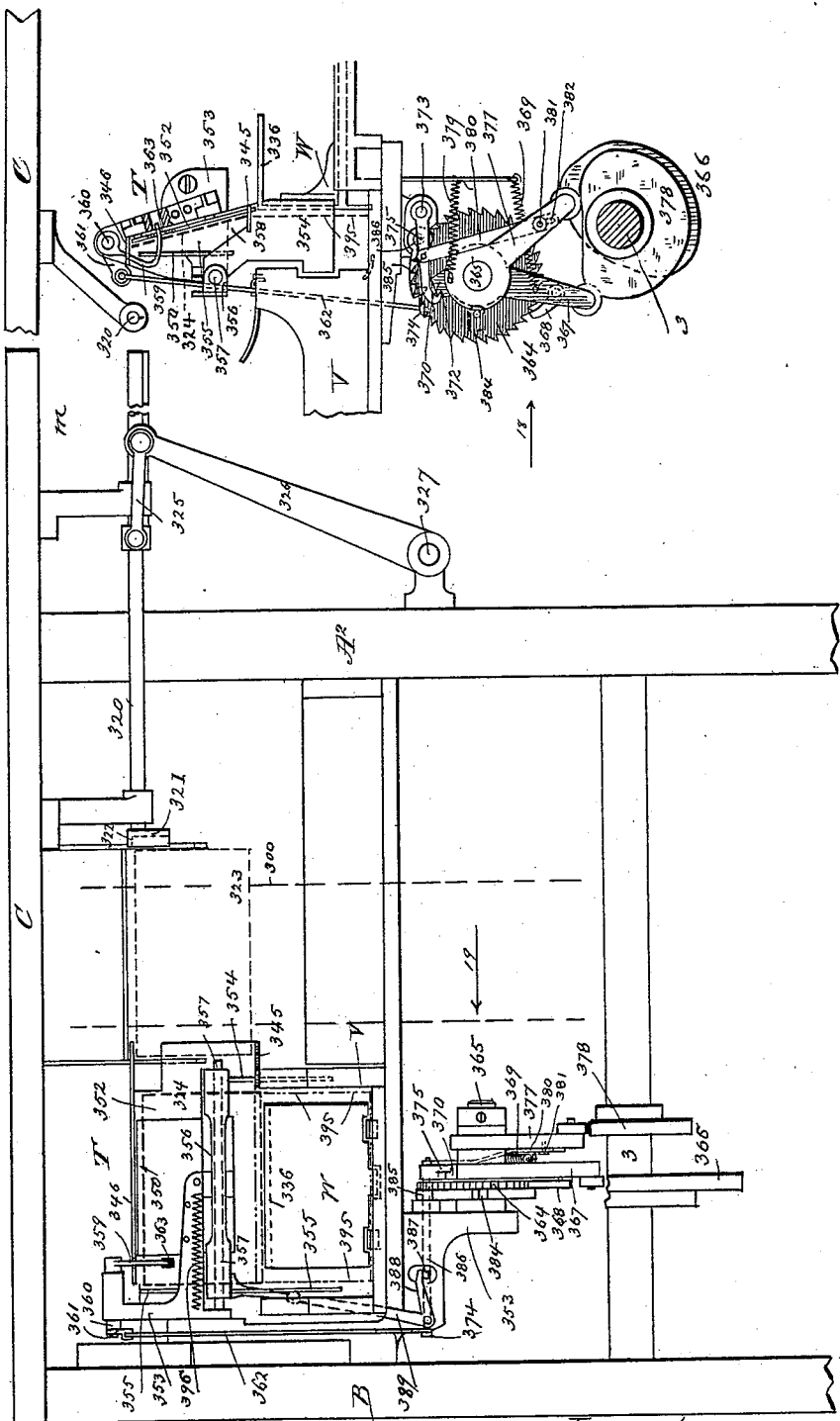

(No Model.) 10 Sheets—Sheet 10.
C. H. HEYWOOD.
MACHINE FOR MAKING AND PRINTING ENVELOPES.
No. 420,792. Patented Feb. 4, 1890.
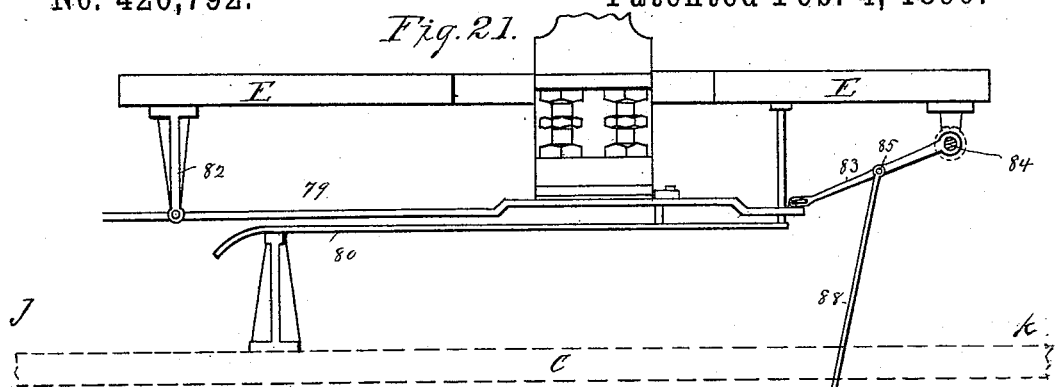
Fig. 21.
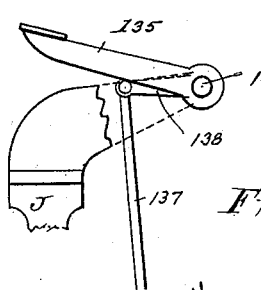
Fig. 22.
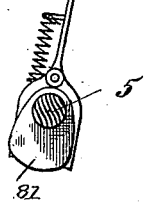
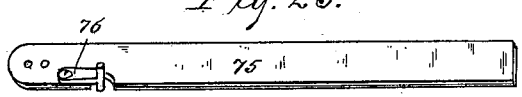
Fig. 25.
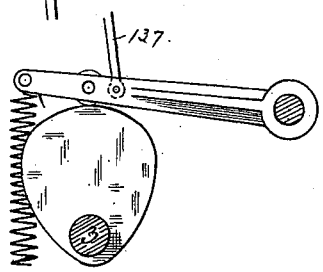
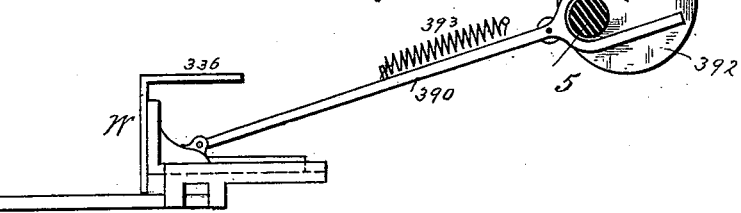
Fig. 23.
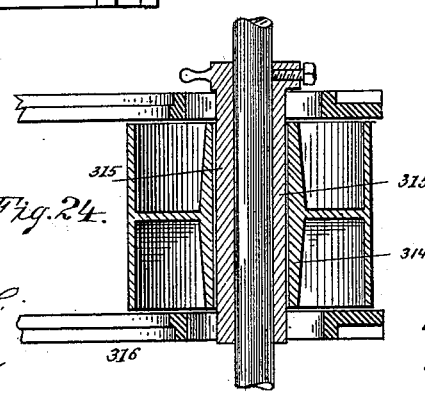
Fig. 24.
Witnesses:
Wm. F. Bellows.
J. W. Garfield.
Inventor
Chas. H. Heywood,
per Chapin
Attorneys
N. PETERS, Photo-Lithographer, Washington, D. C.

UNITED STATES PATENT OFFICE.

CHARLES H. HEYWOOD, OF SPRINGFIELD, MASSACHUSETTS.

MACHINE FOR MAKING AND PRINTING ENVELOPES.

SPECIFICATION forming part of Letters Patent No. 420,792, dated February 4, 1890.

Application filed January 14, 1889. Serial No. 296,272. (No model.)

*To all whom it may concern:*

Be it known that I, CHARLES H. HEYWOOD, a citizen of the United States, residing at Springfield, in the county of Hampden and State of Massachusetts, have invented new and useful Improvements in Machines for Making and Printing Envelopes, of which the following is a specification.

This invention relates to envelope making and printing machinery, the object thereof being to automatically feed and present envelope-blanks to the action of gumming and printing mechanism, to thence convey the gummed and printed blanks to the action of creasing and folding mechanism, and to then dry and deliver the envelopes in clearly-defined bunches.

The invention comprises improvements in mechanism controlled by the presence or non-presence of a blank on the gumming-bed and acting in conjunction with the gumming-bed-actuating mechanism, whereby in the operation of the machine, in the event of the non-presence of a blank on the gumming-bed, accidental or otherwise, the said bed will then be carried to and held at a height below the plane of impact thereupon of the reciprocating gummer; in conveying devices for moving the blanks from the gumming-bed to the creasing and folding frame, and in adjusting devices operating in conjunction therewith; in the seal-flap folder mechanism, and in co-acting devices for peculiarly delivering the envelopes to the drying-chains; in devices for expelling the envelopes from the chains, and in receiving and bunching mechanism and in counting mechanism.

The invention further consists in the combination, with a gumming-bed having an aperture or recess in and through its body, of a platen above said aperture, a printing-bed adapted to have a reciprocating movement through said aperture, and a reciprocating gummer, the said gummer and type-bed being arranged for their reciprocatory movements in lines embraced within the area on said gumming-bed to be covered by the blank to be gummed and printed thereon, whereby a blank resting upon said bed may be gummed and printed without moving the blank between the one operation and the other.

The invention further consists in minor details of construction, as will hereinafter more fully appear, and be set forth in the claims.

In the accompanying drawings, forming part of this specification, the mechanism constituting the present invention is illustrated, and similar characters of reference indicate corresponding parts in all the views.

Figure 1 is a horizontal section of the machine on a plane through the supporting arch-standards below the printing-type-receiving platen and the gum-box plate, the essential parts illustrated by said view being seen in plan view. Fig. 2 is a vertical cross-section of the machine about on the line $a\ a$, Fig. 1, the supporting-arch, however, being removed. Fig. 3 is an elevation of the machine as seen at right angles to Fig. 2, but with certain parts above the table shown in section on the line $b\ b$, Fig. 1. Fig. 4 is a front elevation of the pneumatic picker; and Fig. 5 is a plan view of the same, the slideways therefor being shown in horizontal section. Fig. $4^a$ is a vertical section in detail on line $4^a$, Fig. 4. Fig. 6 is a side elevation of the mechanism to be actuated by the presence or non-presence of a blank on the gumming-bed for controlling the extent of the upward movement of the gumming-bed. Fig. 7 is a plan view thereof; and Fig. 8 is an elevation of a portion thereof, seen at right angles to the view, Fig. 6. Fig. $8^a$ is a detail view, in cross-section, of one of the rock-shafts shown in the other views on said sheet and an elevation of one of the bearings therefor, showing in connection therewith stop devices, to be hereinafter particularly referred to. Fig. 9 is a side elevation of the mechanism to be actuated by the presence of a blank on the gumming-bed for controlling the extent of throw of the vertically-movable printing-bed. Certain parts common to the last-mentioned mechanism and that stated to be illustrated in Fig. 6 are to be seen in both illustrations. Fig. 10 is a horizontal section of parts of Fig. 9 as seen below the line $c\ c$ on said Fig. 9. Fig. 11 is an elevation of the mechanism for operating the creasing-plunger as seen from the opposite side to that shown in Fig. 3, and Fig. 12 is an elevation of the same as seen at right angles to Fig. 11. Fig. 13 is a horizontal sectional view in detail, taken on the line $d\ d$, Fig. 11. Fig. 14 is a view in side elevation of the rolls and the supports therefor for carrying the tapes employed for feeding the blanks from the supply-pile to the gumming-bed, and Fig. 15 is an edge view of same. Fig. 16 is a vertical sectional view of the creasing-frame and folding mechanism and the drier-chain below in side elevation. Fig. 17 is a detail plan view of the folding-bed. Fig. 18 is an elevation of the mechanism for receiving the envelopes from the chains and for delivering to the receiver-box, said view also including the counting mechanism. In this view the general position of the drier-chain is indicated by dotted lines. Fig. 19 is a front view of the parts shown in Fig. 18. Fig. 20, Sheet 4, is an enlarged detail view of a device hereinafter specially described. In Sheet 10, Fig. 12 is a view in elevation of mechanism for operating one of the adjustable gage-carrying guiding-strips hereinafter described. Fig. 22 is a view of mechanism for operating the gummers. Fig. 23 is a view of mechanism for operating an envelope-pusher, hereinafter described. Fig. 24 is a sectional view of a drier-chain-supporting pulley and an adjustable bearing therefor. Fig. 25 is a view in detail of one of the feed-in fingers for blanks, to be hereinafter described. Fig. 26, Sheet 6, is a rear view and partial section of a portion of what is hereinafter termed the "shifter."

The operative parts of the machine are directly or indirectly supported on the end standards A A² and intermediate standard B, suitably braced by cross-girders $i\ i$ and the table C.

$j$ represents what is most properly termed the "front side" of the machine; $k$, the rear side; $l$, the front end, and $m$ the rear end.

Four shafts are employed, herein designated as shafts 1, 2, 3, and 5, which run from end to end of the machine, and there is also another shaft 4, which extends between the front end and intermediate standards A B. Power is primarily communicated to the machine through the shaft 1, which, through its spur-gear $n$, meshing with the gear $o$ of shaft 2, secures the rotation of the latter shaft. The gear $o$ meshes with the spur-gear $p$ on shaft 3, securing its rotation, and a spur-gear $q$ on said shaft 3 in an offset plane engages with a gear $r$ of the shaft 4, with which an idler-gear $s$ meshes, and also engages with a gear $t$ on shaft 5. A driving-pulley 6 is secured on shaft 1, and on shaft 2 is fixed a balance-wheel 7. The gum-rolls 30, mounted in journals of the gum-boxes 32, with their arbors 33 33 ranging horizontally lengthwise of the machine, receive rotary motion through the cross-shaft 34, having bevel-gears 35 35 meshing with bevel-gears on said gum-roll arbors, and said cross-shaft receives its rotation by being bevel-geared, as at 38, with a vertical shaft 39, which in turn is miter-geared, as at 40, with the shaft 5. The gummer-rollers 42 42 move with their boxes on horizontal tracks 43 across the lower face of the reciprocating gummers 44 when raised, and normally rest upon the gum-rolls, as usual, receiving their sliding movements through the connecting-rods 45 45, secured to the slide-boxes of said rolls, and to the ends of an intermediately-pivoted lever 46, to a radial arm 47 of which, extending from the center of rotation thereof, a connecting-rod 48 is secured, which by its other end is fastened to the end of a lever 49, swinging from a fixed girder-shaft 50, between the standards, and a cam on shaft 3 (not shown, but working against an intermediate part of said lever) imparts the required vibratory motion thereto in a manner well-known in envelope-machines.

Blanks from which the envelopes are to be formed are held at a proper and substantially uniform height by the blank-supporting table M of the elevator, which is to be of the construction illustrated and described in an application for Letters Patent filed by me May 25, 1888, Serial No. 275,073, or of other approved form.

The picker D, which is of the pneumatic class, comprises a series of vertical tubes 53 53, vertically movable through and spring-pressed from horizontally-projecting lugs 54 of a carrier-plate 55, which is vertically movable in ways 56, secured to the gum-box plate E or other suitable fixed part of the machine. Each tube (see Fig. 4) at a slight distance above the place of its passage through the socket 57 of the lower lug 54 has a radially-projecting pin 58, between which and the under side of the upper lug is placed a spiral spring 59, the recoil of which serves to maintain the picker-tubes normally in their lowermost presentation, which is limited and made uniform as to all the pickers by the regularly-arranged and laterally-extending abutment-pins 60 of the tubes a slight distance above said upper lug. That on the downward thrust of the picker against the pile of blanks the tubes may not be forced upwardly with relation to the socketed lugs to an excessive extent a stop-pin 62 is placed on one or more of the said tubes a short distance below the lower lug. Each tube has a continuous passage through it and is open at its lower end, and to its upper end a flexible air-conduit 63 is connected, which extends to a common chamber 64, conveniently located on a fixed part of the machine.

The picker is reciprocated by means of a connecting-rod 65 between a radial arm 66 on a rocker-shaft 67, supported in stands from the gum-box plate, and an ear-piece 69, formed on the supporting-plate 55 of the picker, the said rocker-shaft being actuated in any desired manner. The vacuum is produced in the chamber 64 through the conduit $u$ from the suction-pump F², (seen in Fig. 2,) which is pivotally hung by one end on the machine-frame, the reciprocating motion to the plunger 70 of which is imparted by the swinging of a lever 72, hung on said girder-shaft 50 and moved by the forked thrust-rod 73, receiving its motion in one direction by a cam 52 on shaft 3, the return movements of the parts being under the reaction of a spring 74.

The blanks x, by their front edge portions, are raised by the pneumatic picker, which is properly located therefor, and are then carried by the action of sliding feed-in mechanism to the feeding-in tapes. The feed-in mechanism F is in substance the same as illustrated in my former application, being guided and receiving its reciprocating motion as therein stated; but instead of having downwardly-curved fingers its carrier-bar is provided with flat horizontal slide-fingers 75 75, located in a plane slightly above the level of the top of the pile of blanks and provided with abutment-lugs 76 on its upper side. After the picker has lifted the front edge portion of a blank and the suction thereof has ceased such portion drops; but the feed-in slide-fingers at such time have been moved inwardly nearly or quite to the position seen in Fig. 1, and having a slight further inward movement the blank is fed to enter by its rear edge to the bind and carrying action of the carrier-tapes 77 78.

In connection with and as forming a part of the feed-in mechanism a separator-slide may be employed, having an operation substantially as described in my aforesaid application; but the provision of this device is here deemed unnecessary, for by giving a proper periodicity and duration to the suction in the picker-tubes the blank may be held raised until the horizontal slide-fingers 75 in their inward movement are projected sufficiently under the blank.

Upper and lower pairs of slide-strips 79 80 are arranged at each side of the main middle portion of the blank, extending from the front toward the rear of the machine, and at their rear ends terminating at or about at the rear side of the gumming-bed, which is located at the rear of said feed-in tapes. The lower slide-strip of each pair has its forward ends just at the rear of the edges of the end flaps of the blanks, being downwardly deflected thereat, and are held stationary by any suitable supporting means. The upper slide-strips 79 of both pairs extend by their forward ends over the end flaps of the blanks, being supported thereat by pending rods 82, secured to the under side of the gum-box plate, and the one toward the front end l of the machine is similarly fixed and suspended by its rear end, while the upper slide-strip toward the rear end m of the machine is hung on the end of a radial arm 83, which is loosely supported on a horizontal shaft 84, having suitable bearings in hangers from the gum-box plate; and to a laterally-projecting-stud 85 on an intermediate part of said radial arm 83 a connecting-rod 88 is secured, its other end being in engagement with and to receive a reciprocating motion from a cam 81 on shaft 5, and at a certain instant in each operation of the machine said slide-strip will be raised by its rear end swinging from its forward end as a pivotal point.

G represents the "gumming-bed," which is of a general rectangular form, having an aperture 89 in its middle portion, outside of which it is of a form to serve as a support for the flaps of the envelope-blank, the proper location of one thereon being indicated in dotted lines at x' in Fig. 1.

Adjusting and abutment lugs 90 90 are to be provided on the slide-strips 79, so that the blanks may not be carried rearwardly farther than desired and necessary to be in proper position to be gummed or printed, or both, and the one on the upper slide-strip 79 toward the end m of the machine, projecting downwardly and normally to be across the plane of travel of the envelope-blank, of course moves upwardly out of such plane when the slide-strip is upwardly moved, as already explained. It is immaterial on which of the slide-strips the abutment-lug 90 toward the front end of the machine is located, whether on the upper or lower one, it being observed that it must always, however, project across the horizontal plane of travel of the blank.

As seen in Figs. 14 and 15, the feed-in tapes 77 78 are carried on two sets of rolls 92 and 93—upper and lower. The rolls of the upper set are carried in bearings suspended from the gum-box plate. The arbor 94 of one of the rolls of the upper set is provided with a spur-gear 95, and receives its rotation in the proper direction through a train of gears (indicated at 96, Fig. 2) from the arbor 33 of one of the gum-box rolls, to which rotation is imparted in the manner already described. The lower set of rolls 93 for the other tape is journaled in bearings of a stand resting on the table C, and its endless tape, being in frictional contact with the upper tape, is moved thereby and therewith. The stand for the lower set of tape-rolls is provided with a slot 97, having a general direction at an angle to the line of the tape from the lower edge of the one roll to that of the other, and an adjustable tightener-roll 98 is guided and adapted to be fixed at any point in the length of said slot, whereby it may take up any slack in the tape. A similar tightener-roll, plainly, may be employed for the upper set of tapes.

Slideways 99 are formed in the under side of the gum-box plate above and having a direction parallel with the feed of the last-described tapes, and a frame 100 is movable in said ways, carrying a pair of legs 102, extending obliquely downward at each side of the feed-in tapes, and on the lower ends of said legs are pivoted dogs 103, adapted to swing from a pivotal point intermediate thereof, with their forward ends lowermost. The said frame 100 receives its horizontal reciprocatory motion from the connecting-rod 104, attached thereto, and to the radial arm 105 on a rocker-shaft 106, the rocking motion being imparted to said shaft by the engagement with another radial arm 107 thereof of a rod 108, actuated by a cam 109 on the shaft 2.

The paper-feeding mechanism comprising the pneumatic picker, the feed-in slide-fingers, the slide-strips, and the pivotally-supported and reciprocating dogs hereinabove described as forming part of the envelope-machine here illustrated, as will be plain, are applicable for feeding paper in other situations, and have been deemed to constitute a separate invention from and no part of this improvement in envelope-machines, except in so far as they may be identified with the envelope-machine by their co-operative combination with parts strictly and exclusively appertaining to such machine, and said devices last above mentioned form the subject-matter of an application for Letters Patent of the United States for improvement in mechanism for feeding sheets of paper, filed by me October 4, 1889, under Serial No. 362,037.

The gumming-bed G is carried by a pair of parallel arms 110, which by their forward ends are pivoted on stands 111 near the front of the table C, from which they may swing, and said arms at their rear ends behind the gumming-bed are carried on the lower ends of links 112 112, which by their upper ends are carried by radial arms 113 113 of a rocker-shaft 114, which is also provided with another radial arm 115, which receives its back-and-forth swinging movement from its connection with a thrust-rod 116, operated from a cam 117 on shaft 5. (See Fig. 6.)

A peculiar latching form of connection between the thrust-rod 116 and the radial arm 115 will be hereinafter described in connection with the mechanism for securing a non-gumming effect on the absence of a blank on the gumming-bed when the same is carried upwardly.

The printing-bed H is movable in vertical slideways 118 in the standards A B below the table, and at its upper side carries the form and type for printing through the aperture of the gumming-bed upon the middle portion of the blank and against a fixed platen supported under the arch. A pair of toggles $g$ $g$, operated by cams 120 on the shaft 2, gives the rising-and-falling motion to the type-bed. Each of the duplicated toggle devices consists of the stirrup 122, pivotally connected at 123 to the type-bed, and receiving a tension-rod 124, having a screw-thread and set-nut engagement therewith and a triangular lever 125, which by one end of its hypotenuse line is pivoted to the lower end of the said rod 124, is fulcrumed at its apex, as at $h$, and at its other point is provided with a roller 126, against which the said cam 120 operates to straighten the toggle, a suitable spring 127 causing the doubling of the levers for lowering the platen at the proper period.

The gummers 44 are carried on two rods 130 130, playing through bearing-guides 132 of a fixed standard 133, supported from the arch J above the gumming-bed, united by a tie-beam 134 on the side, and at the center of which a roller 131 is journaled. The gummer-rods are moved upwardly by the bearing of the upper side of the end portion of a radial swinging arm 135 against said roller, said radial arm being carried on a rocker-shaft 136, supported in stands on the arch J, and having another radial arm 138, to which one end of a connecting-rod 137 is secured, its other being connected to the end of a lever 139, swinging from the girder-shaft 50, said lever receiving its upward movement from a cam on shaft 3, as seen in Fig. 22. The gummers, raised in the manner described, are permitted to fall for their gumming action by their own weight with and on the radial lever-arm 135, the limit of the downward movement of said arm being made to correspond approximately to the required downward throw of the gummers.

Upon the standard 133 above the pintle 142 for the roller 131, which is projected laterally, is a short rocker-shaft 143, having thereon a radially-projecting hooked arm 144, adapted to be swung into and out of a position of engagement with said roll-pintle 142. To a radial arm 145 on said rocker-shaft 143 one end of a connecting-rod 146 is fastened, which is curved by its other end to encircle the shaft 67 on the stand at the front of the machine and pivotally engages by its end with the loose collar 147 on said shaft, as seen in Fig. 2 and in detail in Fig. 20. A curved arm 148 is also pivoted to said collar, to which a spring 151 by its one end is attached, being by its other end secured to a stationary part of the machine. The turning of the collar by the radial handle 149, or otherwise, in one direction places the hook into position for engagement with the pintle 131, the reverse movement of the collar placing the collar out of engagement therewith, and thereby the gummers may be supported in an elevated position and without any interference with the running of the machine, it being understood that the said spring 151 will act to maintain the parts in whichever positive position they may be placed, whether for the hook to be in or out of engagement with the pintle carried on the plunger tie-beam, according as the point of the pivotal engagement of said curved arm 148 is at either side of the line of spring strain.

150 represents a reciprocating bridging-slide about on a level with the slide-strips 80, so operated as to be projected into a position over the rear part of the gumming-bed when in its lowermost position for supporting the rear flap when fed forward to its position to be gummed and printed, the said slide being withdrawn just before the gumming-bed is carried into its uppermost position. The said slide plays through ways of a hanger 152, its upper surface being provided with rack-teeth, with which a spur-gear 153 meshes, which is carried on a rock-shaft 84, which has bearings in said hanger, and is further supported on another hanger 154. The said rock-shaft is provided at a suitable portion of its length with a pinion 155, and supports a guiding-shoe K, through which a rack 156 reciprocates, and is held thereby in engagement with the pinion, said rack being actuated by the cam 157 on shaft 5.

The form of guiding-shoe K above mentioned is shown more in detail in connection with the mechanism employed for operating the reciprocating folder-plunger, Figs. 11, 12, and 13, in which it is also employed, and consists of a back plate 158, provided with right-angled ear-pieces 159 159, having perforations 160 for bearings loosely surrounding the shaft, and between which ear-pieces the fixed pinion of the shaft is disposed. The rack, playing through the said shoe behind the pinion, being guided by the back wall and insides of the ear-pieces by its rack-teeth on its front side, engages the pinion. The shoe, being loosely supported on the shaft, may swing thereon to correspond to the swinging motion of the cam-actuated rod, which motion is imparted thereto by the lateral throw of the cam.

The mechanism for insuring the rising of the gumming-bed a less distance than usual in the event of the non-presence of a blank on said gumming-bed at the time of its being carried upwardly consists in the combination of parts and operates as follows:

170 represents a horizontal rocker-shaft supported on a stand 171 of the table C, and carries a radially-extending fixed arm 172, having a downwardly-extending foot 173, which stands over an aperture 174 in the portion of the gumming-bed for supporting one end flap of the blank, so that when the gumming-bed rises with a blank thereon the said foot will by said blank be raised and the shaft 170 rocked. There is on said shaft 170 an upwardly-extending radial arm 175, having near its upper end a lateral shoulder or abutment extension 176.

The cam-operated and vertically-reciprocated thrust-rod 116 is provided with an angular pawl $f$, one arm 177 of which is hooked and the other 178 thereof extends into proximity to the abutment-shoulder 176 on the arm 175, and is provided with a laterally-extending pin 179, which projects to intersect the line of the said shoulder when the same is in the position seen in Fig. 6, such position being only insured, however, by the non-presence of a blank on the gumming-bed. Therefore, so assuming the absence of a blank from the gumming-bed and the relation of the parts, as shown in Fig. 6, on the then-continued upward throw of the thrust-rod 116 the pawl will be swung on its pivot 180, owing to the contact of the pin 179 against the shoulder 176, as explained, and the hooked arm 177 will be swung out of engagement with the laterally-projecting stud 182 on the radial arm 115, and just before the gummers descend to their limit of downward movement said radial arm will fall back or swing downwardly, its pin 182 moving down through the slot 183 of the thrust-rod until the abutment-pin $114^a$ on the rock-shaft 114 comes to a bearing on the stop $114^b$ of the bearing-support, (see Fig. $8^a$,) and the radial arms 113 113 on said rock-shaft, which carry the gumming-bed through the link-connection, will also fall downwardly, and the thrust-rod finishing its upward movement will not operate to carry the gumming-bed upwardly so that it would be in position to receive the impact of the gummers. The thrust-rod next moving downwardly, the pin 182, with the arm 115, being in its lowermost position, as determined by the abutment-pin and rest for affecting the roll of the rock-shaft 114, (shown in Fig. $8^a$,) the pawl $f$ swings back to its normal position, and it will here be noted that the thrust-rod has such an extent of downward throw as to carry the pawl-hook below the position of the pin 182, and before said thrust-rod again moves upwardly the hooked arm of the pawl carried thereon will snap into engagement with said pin 182, and then on an upward throw of the said thrust-rod and with a blank on the gumming-bed covering the said aperture 174 the rock-shaft 170 will be swung so that the abutment-shoulder 176 on arm 175 will be carried across and beyond the vertical line of travel of the pawl-pin 179, and then, of course, said pawl will not be swung, its hook-support for the radial arm-pin 182 remaining intact, and a full upward throw of said arm, with the thrust-rod, is secured, a full extent of upward throw of the gumming-bed being also obviously effected. The angular pawl $f$ is to be provided with a spring 181, or properly weighted, whereby it is caused to retain its normal operative position.

The mechanism for securing a controlling of the upward movement of the printing-bed H by the non-presence of an envelope-blank on the gumming-bed depends on securing a lowering of the fulcrum-point $h$ for the triangular members 125 125 of the toggle mechanism. The said fulcrum-points $h$ are formed by the cranked portions of a horizontal crank-shaft L, mounted in fixed supports of the machine-frame extending between the standards A and B, and also projecting through the one B, receiving at its extension a disk 185, the same being keyed thereon. The crank-shaft is normally set to present its cranked portions about vertically over its axis, as indicated. The shifter-disk has a nose 186 for abutment against a stop-lug 187 on the frame for limiting its swing when carried into its said normal position, and is also provided with another abutment-nose 188 for permitting the engagement and rest thereon of a vertically-disposed locking-lever 189 pivotally hung on the frame, a spring 190 tending to keep said lever in its position of engagement, as shown. The said disk 185 has a notch 192 formed in its upper edge, and its periphery is rabbeted, as at 193, between said notch 192 and its abutment-nose 186, so that the said disk may be partially rotated in the direction of the arrow 194, Fig. 9.

N represents a shifter provided with a hub 195, loosely surrounding the crank-shaft outside of the crank-shaft disk, having a radially-extending arm 196, with an extension 197 offset to lie across the vertical plane of said disk, and having therein a radial socket 198, in which is disposed a slide-dog 199, held therein by a strap 200, said dog being provided with a laterally-extending pin 202, the outward movement of which on and with said dog 199 is limited by the end of a short slot 203 in said strap. (See Fig. 26.) A regular parti-rotatable reciprocatory movement is secured to said shifter N by means of the pivotal engagement with the radially-extending arm 204 thereof of the end of one member 205 of a toggle $v$, the other member 206 thereof being pivotally hung, as at 207, on a stud of the machine-frame, the distending action being imparted to said toggle by a cam 208 on shaft 2 working against the intermediate pivotally-connected part of the toggle, a spring suitably secured to the toggle causing the doubling up thereof, when permitted so to do, under the rotation of the cam.

$w$ represents a spider-lever having three substantially radial arms 210, 213, and 215, said spider being intermediately pivoted on a boss of the frame B, as at 211. One leg 210 of said spider-lever is properly formed and normally located in the path of the tappet-cam 212 on shaft 3 to receive at each revolution thereof a rearward movement therefrom, swinging its arm 213, which has a notch 214 in its end, downwardly, and its upwardly-projecting arm 215 swings forward so that its end may be engaged by the hook 216 of a catch-lever 217, located in the vertical plane of said arm 215, and carried on a horizontal shaft 217$^a$, which is adapted to roll or oscillate, and for its support may be extended from the standard A to, through, and beyond the standard B, and said shaft 217$^a$ also has another radially-extending lever 217$^b$ affixed thereto, which is, however, in a plane coincident with or adjacent to that of a "gravity-bar" 228, to be soon hereinafter mentioned, and which gravity-bar as at present arranged is in the same vertical plane as the arm 172 and the gum-bed aperture 174, hereinbefore referred to. The forwardly-extending arm 213 is also provided with an upwardly-extending stud 218. The lever 189 has a rearwardly-extending arm carrying in an offset plane a pivoted dog 220, having a spring 219 applied between it and said arm 189 for maintaining said dog normally depressed, said dog being provided with a stop-lug 222 for limiting its downward swing.

225 represents a horizontally-disposed thrust-rod operated from a cam 221 on shaft 2 in one direction and under the recoil of a spring in the other across the line of said dog 220 when in its depressed position.

228 represents a gravity-bar capable of a vertical movement within certain limits and guided by any suitable means upon the frame of the machine. Said gravity-bar is hooked at its upper end, as at 229, and is provided toward its lower end with a lateral stud 230, to abut against the forward arm of the intermediately-pivoted catch 217 when said bar is permitted to drop.

A downwardly-extending radial arm 232 is fixed on the rocker-shaft 170, which is oscillated, as heretofore explained, said radial arm being hooked at its lower end, as at 233.

On the shaft 5 (see Fig. 6) is a snail-cam 234, which operates upon one arm 235 of an angular lever O, its other arm 236 extending forwardly for an engagement with a pin 237 on said gravity-bar.

Under the usual running of the machine, and envelope-blanks being regularly fed onto the gumming-bed at each reciprocating of the parts, the shifter is swung through a quarter of a circle, the pin 202 of its dog 199 being carried into the notch 214 of the spider-arm 213, and then said pin, by the movement of said spider, is quickly carried downwardly and the dog is moved with it into and then out of the notch 192 in the crank-shaft disk. The spider-lever is permitted to be moved by its spring to carry the dog out of the said notch by the disengagement of its arm 215 with the catch-hook 216, the same being accomplished by the dropping of the gravity-bar, when the snail-cam under its rotation permits the arm to suddenly swing inward, its arm swinging downward out of support for the gravity-bar, and no effect is had by the shifter to move the crank-shaft disk and crank-shaft. By the non-presence, however, of an envelope-blank on the gumming-bed, the shaft 170 is not oscillated, and at the time it would otherwise be permitted to drop, by the operation of the lever O and snail-cam mechanism, it (the gravity-bar) is prevented from so dropping, being caught or held by the hooked arm 232, and after the dog has been carried down into the notch of the crank-shaft disk it is not lifted out thereof by the arm 213, for the same is engaged by the catch 216 and not permitted to make the return swing with its spring, and the dog 199 is not upwardly moved out of the notch 192, and then on the rearward movement of the thrust-rod 225 it abuts by its nose against the pivoted dog 220, forcing the arm 189 rearwardly, so that its lower end passes out of engagement with the nose 188 of the crank-shaft disk, freeing the same for rotation when on the doubling up of the toggle $v$, carrying the shifter-arm 196 downward and forward, the shifter-disk is partially rotated therewith, and the center line of the cranked portions of the shaft is carried downwardly, so that the distance between the fulcrum-point of said toggle and the face of the platen is increased, and whereby on the upward projection of the printing-bed thereby it will be carried only to within a short distance of the plane of printing.

A rib 240 of quadrant form is cast on or secured to the frame B, as indicated in dotted lines in Fig. 9, and in plan, Fig. 10, said rib serving to maintain the dog 199, through its pin 202, from any endwise movement on the shifter-arm 196 in its traverse, so that when the dog is raised out of the notch 192 in the regular and proper running of the machine the pin will be made to traverse on the upper side of the rib; but when the dog is not lifted out of the notch, owing to the failure of the gravity-bar to drop, the pin will traverse on the under side of said rib, and will continue so to do for as many times as the machine reciprocates and the gravity-bar is held from dropping, and of course under such a disposition of the parts the crank-shaft will be partially rotated at each reciprocation of the machine to afford the lowered fulcrum from which the printing-bed toggle mechanism is operated. By the automatic controlling of the gumming-bed and of the printing-bed, as described, plainly, when no envelope-blank is on the gumming-bed, the said bed will not be covered with gum from the gummers, nor will the platen be covered with ink from the type on the printing-bed.

The mechanism hereinabove described for insuring from the presence or non-presence of the blank on the blank-supporting or gumming-bed the correspondingly proper controlling of the printing-bed is not claimed herein, but forms the subject-matter of a separate application for Letters Patent of the United States for improvements in printing-machines, filed by me October 4, 1889, under Serial No. 326,036.

After the envelope-blanks have been gummed and printed they are conveyed from the gumming-bed to the creasing-frame in a direction at right angles to the line of feed to the gumming-bed.

As indicated by dotted lines in the plan view, Fig. 1, the envelope-blank by its end flap toward the folder mechanism projects beyond the edge of the gumming-bed slightly, which may be recessed, as shown at 250, and above said projecting end of the blank is a roller 252, around which and one or more other rollers 253, suitably supported in hangers 254 from the arch J, is an endless carrier-tape 255. Below the carrier-tape is another carrier-tape 256, having a portion of its length in contact with a portion of the length of the upper tape, and another portion of its length toward the gumming-bed is adapted to be carried into and out of contact with the tape thereabove.

257 represents a roll for driving and partially supporting the tape, receiving its rotary motion by its shaft through any suitable means. The tape thence passes onto the under periphery of the two rolls 258 259 and partly around the latter, and thence rearward over and beyond the periphery of the roll 258 to above the periphery of said driving-roll to and partially around another roll 260, thence around one or more tightener-rolls 262 to the point therein at which the above description was commenced.

The roll 259 is carried on the radial arm 263 of an oscillating hub 264, loosely supported on a horizontal arbor 266 and receiving its rocking motion through the other radial arm 265 thereof, the same being fastened to one end of a connecting-rod 267, receiving its rotation from a cam in the same manner as described and shown for many of the other connecting-rods employed in this machine. The said arbor forms the support and bearing for the roll 258. At the time of gumming and printing the blank the roll is carried downwardly; but after the blank has been gummed and printed and the mechanisms for performing such functions have been withdrawn the roll 259 is swung upwardly with the tape 256 thereon to bind the blank between it and the upper tape, when the blank will be by said moving tapes fed forward over the creasing-box under the plunger-block 268.

269 269 represent a pair of blank-adjusting arms swinging on and radially from a rock-shaft 270, to the one end of another radial arm 272 of which a connecting-rod 273 is secured, its other end being secured to a radial arm 274 on another rock-shaft 275, receiving its roll from a rod 271, connected to a radial arm $271^a$ thereof, and engaging a cam $271^b$ on the shaft 5. The said arms are swung upwardly forward at the time of the feed of a blank from the gumming-bed, and after such blank has been carried out from between said tapes 255 256 onto the creasing-frame P, said arms swing against the edge of said blank and move it slightly forward to the adjusting abutment-gages 276 276, the blank being then in position to be forced downwardly through the rectangular opening in said frame by the creasing-plunger onto the folding-bed Q, to be then acted on by the flap-folder wings.

The novel mechanism for operating the folder-plunger will be now described, and consists in providing a rack-bar 278 on the rear edge of the folder-plunger shaft 279, and providing to mesh therewith a spur-gear 280, which is carried on a horizontal shaft 281, journaled in boxes of the arch. The said shaft carries a pinion 282 at another portion of its length, and through a loosely-journaled shoe K of the construction already described, and supported on said shaft, plays a racked reciprocating rod 283, the upward movement of which is imparted thereto in one direction by a cam 284 on the shaft, a spring 285 securing the return movement of the said rod.

The blank having been forced onto the solid folding-bed Q, with its flaps creased as usual, the flaps thereof are then folded down by end-flap-folder wings 286 286, operated by rack-and-pinion mechanism, which are not herein claimed to be particularly novel, and by a rear-flap-folder wing 287 of ordinary construction, and by a front-flap folder 288, which possesses many features of novelty. The practically solid folder-bed, which is immovable and fastened to and partially filling a recess 289 in the table C, serves the same purpose as the usual hinged and downwardly-swinging trap-door, the envelopes being delivered to the drier-chains below the table C in a peculiar manner, as will shortly appear.

290 represents a frame pivotally supported intermediate thereof, by which it may be rocked, its forward end 292 serving as an abutment to limit the swing of said frame in one direction when brought in contact with the under side of the table C, the face of the platform 293, carried by its other end, being then about flush with the top of the table and extending through the open recessed part of the said table at the front of the folder-bed. A block having ear-pieces 294, to which the front-flap folder is pivoted, as at 295, is supported on and moves as one with said platform. The said frame 290 receives its swinging motion by being provided with a fixed arm 296, extending radially from its center of oscillation, to which a connecting-rod 297 by one end is secured, its other being fastened to one end of a lever 298, which lever by its other end is hung for a swing on the girder-shaft 299, supporting one end of the drier-chain 300, and a cam 301 on shaft 3 works against the intermediate portion of said lever, imparting the swinging motion thereto in the same manner already described for other similar movable connections. The front-flap folder receives its opening and closing swinging movement through the connecting-rod 302, intermediately-pivoted swinging arm 303, and thrust-rod 304, operated from the cam 305 on shaft 5. After the creased blank has been forced upon the folding-bed and having been operated upon by the folders, (the parts shown in Fig. 16 being indicated as in the positions they are made to occupy at this stage of the operation,) the folder-flaps are then swung up, and the frame 290 is then swung, carrying the front folder upward and forward and leaving the recess 289 directly in front of the folding-bed unobstructed. The folded envelope is then forced forwardly and downwardly into the chain, being guided by a chute formed by vertical side walls 306 306 and an inclined rear wall 307. The devices for so discharging the envelope from the folder-bed consist of a pair of curved finger-levers $z\ z$, intermediately carried by a rock-shaft 308 under the said bed. Each finger to be described with relation to its position of inaction is curved rearwardly and upwardly to about the level of the top of the folder-bed, and thence is continued rearwardly in a horizontal extension 309 to or beyond the rear edge of said bed, and then terminates in an upwardly and forwardly extending hook 310. The finger-carrying rock-shaft 308 is provided with a radial arm 11, to which a cam-operated thrust-rod is connected, as indicated in Fig. 16, and in the operation of the said mechanism the fingers force and carry the envelope forward and upward by its rear end, its forward end moving down the chute, and the fingers, before being returned to their positions illustrated, follow up the envelope until it stands nearly vertical, or is in line with and upon the rear plate 307 of the said chute to be guided to the chain, the same having certain of its members distended, as usual. The folding-bed is slotted vertically, as at 311, to accommodate the said fingers, and the block to which the rear-flap folder is pivoted is to be cut away, that the rear hooked ends of said fingers may be disposed within and across portions of its length. The endless drier-chain 300, supported at its forward end, as usual, and receiving its intermittent feed movement through ratchet-and-pallet devices 312, operated by a cam-actuated rod 313, is also at its rear end supported and guided on a pulley 314, in substantially the usual manner; but said pulley is eccentrically mounted on its supporting girder-shaft 299, so that the distance between the axis of said pulley and the usual sprocket supporting and driving the forward end of the chain may be varied.

315 represents a sleeve eccentrically bored, fitting over the said girder-shaft, having an extension beyond the side frame 316 of the chain and there provided with a handle for turning it and a set-screw for securing it when properly disposed on said shaft. The hub of the pulley loosely fits over said sleeve, and by properly turning the said sleeve any slack in the chain may be taken up. The envelopes are carried by the chain around the said pulley and returned to where the position of an envelope therein is indicated by the dotted line at 318, and the envelope is then expelled from the chain into a frame-like mechanism T, from which it is then carried to the receiving-box V. The blank is forced out of the chain by a splined pusher-shaft 320, having at its end an arm 321, provided with a U-shaped socket 322 therein, which is adapted to overlie the rear upper corner of an envelope, and the corner thereof diagonally opposite thereto (see Figs. 18 and 19) is supported on a short narrow horizontal plate 345, being carried thereto by the chain, and the so-forced envelope is moved from the position shown in dotted lines at 323, Fig. 18, into a position indicated by the dotted lines at 324 in the same figure, and also in Fig. 19, within the upper portion of the said frame.

The endwise motion is imparted to the pusher-shaft 320 by the link 325, Fig. 18, connected thereto and to the upper end of a radial arm 326, swinging on a rocker-shaft 327, supported in brackets from the frame A². A radial arm 328 is formed on or secured to the said rocker-shaft 327, and to the same is fastened one end of a connecting-rod 329, (indicated in Fig. 16,) its other end being attached to a lever 330, swinging from the girder-shaft 299, and receiving its swinging motion by a cam 332 on shaft 3 working against an intermediate portion thereof.

The frame T, in addition to the narrow short lower horizontal plate 345, before mentioned as on a plane with the lower edge of an envelope in the chain to be next discharged, comprises also an upper parallel plate 346, of about the length of the envelope, a little above the upper edge of the envelope to be discharged from the chain, and over the envelope when it is in its position indicated by the dotted lines 324. The said frame also comprises a rear wall-plate 352, ranging in a plane more or less nearly parallel to and behind the discharged envelope, and also a front plate 350, nearly parallel thereto. The said plates 345, 346, 350, and 352 are supported or suspended from a casting 353, secured on the frame B, and 354 355 represent vertical shifter-blades carried by a horizontally-sliding sleeve 356, which is guided and supported on a long stud or rod 357, rigidly fixed to the supporting-casting on the frame B. The means employed for moving said shifter-sleeve will be hereinafter set forth in connection with the counting mechanism, of which said sleeve and its blades form an essential part.

The shifter-blade 355 farthest from the chain extends nearly to the upper plate, and also below same for about as great a distance, while the shifter-blade 354 nearer the chain has no upward extension beyond its carrying-sleeve, but has a downward extension similar to that of its opposing blade, and said blade 354 is cut away, as at 358, so that it will offer no obstruction to the entrance of an envelope within the said frame.

W represents a horizontally-reciprocating pusher movable in the direction of the length of the receiving-box, being located at the time of the entrance of an envelope into the frame T from the chain under the forward portion of said frame, it being indicated in Fig. 19 as withdrawn from such position, and it is provided at its top and in a plane at or slightly below the short and narrow plate 345 with a rearwardly-extending envelope-supporting bar 336, onto which the envelope is pushed, and by which it is supported momentarily when fully entered into said frame and beyond the short ledge or plate 345 to await the operation of the parts of the counting mechanism.

359 represents a reciprocating curved feeler-finger carried on a horizontal rock-shaft 360, bearing in the casting 353, receiving its rocking motion through a connecting-rod 362, engaging its radial arm 361, and extending to the counter below the receiving-box, and said feeler-finger plays rearwardly against an envelope when resting on the supporting-bar 336 of the pusher, and alongside the plate 352; or when there is no envelope in said frame after a reciprocation of the machine the end of the feeler-finger enters an aperture 363 through the wall 352.

364 represents a ratchet-wheel loosely mounted on a stud 365 of the casting 353, and having a number of teeth corresponding to that desired for a bunch of envelopes—say twenty-five—and from a cam 366 on shaft 3 to work against the outer end of an arm 367, carrying a spring-pallet 368, and swinging from said stud, the return of said arm being under the action of the spring 369, said ratchet is moved around to the extent of a tooth at each operation of the machine, except as hereinafter provided. On the upper end of said arm 367, above its pivotal point, is an extension 370, provided in its side with a notch 372.

373 represents a horizontal rocker-shaft, having a bearing through the lower part of the casting 353, and at its end farthest from the chain it is provided with a radial arm 374, with which said connecting-rod 362, attached to the radial arm for the feeler, is connected. The said rocker-shaft at its forward end is provided with a radial arm 375, hooked at its forward end, and adapted at the time of the non-presence of an envelope in the frame T to be depressed to engage the notch on the arm projection 370 and prevent the arm 367 from following its cam 366 under the action of its spring, and so draw the pallet back far enough as to take a new tooth of the ratchet.

377 represents an arm also loosely swinging from the said stud, and operated by a cam 378 on the shaft 3 and a retracting-spring 379 to give the positive rising-and-falling and swing motions to the radial arms and rock-shaft 373 for operating the said feeler through the connecting-rod 380, engaged with said arm 377, and said hooked radial arm 375. The engagement of the said connecting-rod 380 with the swinging arm 375 is by a pin 381 on the arm passing through a slot 382 in the said rod, the latter being normally supported with the top of its slot resting upon the said pin, and all so that on the rotation of the cam 378 to permit the downward swing of the arm 377, an envelope being in the frame T and the finger 359 not being permitted to have its full rearward swing, owing to its abutment against the said envelope, the said radial arm will not be depressed to permit its hook to take into the notch 372 of the extension of the pallet-carrying arm, and yet the full downward movement of the arm will be permitted, its pin passing downwardly through the slot 382 of the connecting-rod 380. The tendency for a downward swing or movement of the parts—viz., the radial arm 361, radial arms 374 and 375, and the connecting-rod 380—insures the return movement of such parts after they have been moved in one direction positively by the cam 378, and it is this weight which the envelope sustains when in the frame T to prevent the full downward movements of said parts, (the greater portion of said movement being, however, always permitted in any event,) and to permit, consequently, the taking of a tooth by the pallet 368.

384 represents an abutment-dog on the front side of the ratchet-wheel, which in each complete rotation of the same passes against and raises the depressed radial arm 385 of a rock-shaft 386, bearing in and through the casting 353, said rock-shaft being provided with another radial arm 387, engaging one arm 388 of an angular lever, which by its other arm 389 is secured to a fixed projection of the shifter-blade sleeve, and at the time of the passage of said abutment-dog past the said radial arm the shifter-blades will be moved laterally.

The pusher-slide W receives its reciprocatory movement through the connection therewith of a thrust-rod 390, operated in the one direction by a cam 392 on shaft 5 and in the other by the retracting-spring 393. (See Fig. 23.)

The envelope expelled from the chain by the pusher 321, guided at top and bottom by the upper plate 346 and short narrow lower plate 345, and held against undue movement across the plane of its face by the front and rear plates 350 352, on passing to the position indicated by the dotted lines, Fig. 18, its rear lower corner passing from the short plate 345 rests by its lower edge on the supporting-bar 336 of the pusher, which at such time is forwardly presented. By the abutment and impediment of the feeler-finger against the envelope the mechanism controlled by said feeler, as described, is permitted to operate and the ratchet is moved to the extent of one tooth. The pusher then receding from its position of support for the envelope in the frame T, the envelope falls at the rear of the open end of the receiving-box V, such position being indicated by the dotted lines in Figs. 18 and 19. The said pusher W then moving forward, the envelope is forced into the receiving-box V, being, when therein placed, retained or otherwise disposed of in any usual or approved manner. The counter ratchet-wheel once at each revolution thereof, by its abutment-dog 384, through the intervening mechanism, causes, after the envelope has dropped from the frame to the level of the receiving-box bottom and before the envelope is pushed into the said receiving-box, a slight lateral moving of said shifter-blades. The envelope, being slightly moved therewith in the direction of its length, with its end out of alignment with the edges of the preceding twenty-four envelopes, is then pushed into the receiving-box, and the number of envelopes to constitute bunches are accurately and clearly indicated. As soon as the abutment 384 has passed out of a position of contact, the time of which contact is less than the duration of one operation of the machine, the shifter-blades are returned to their normal positions under the action of the spring 396.

From the foregoing description and illustration of the machine herein described, and as has been already to some extent made apparent, certain features thereof are applicable to printing-machines for other purposes than that of envelope-printing, for it will be apparent that blank sheets of paper of rectangular or other desired form may be automatically fed to the printing mechanism, after the printing of which the said blanks may be fed to any suitable receiving devices. Thus certain mechanisms of the machine may be employed for mercantile printing—such as the printing of letter or bill heads, circulars, &c.—and again the machine described may be employed to form envelopes without printing them, may be employed to print and gum, or to merely print or to merely gum envelope-blanks without the forming thereof into envelopes.

The delivery and counting mechanism described is applicable to envelope-machines which in construction are radically different from the one hereinabove described, as is also the mechanism comprising a solid folder-bed and front-flap folder and devices for discharging envelopes from said bed to the chain.

What I claim as my invention is—

1. In an envelope-machine, the combination, with a blank-supporting table, a gumming-bed, and a carrying-support for said bed, which at one end is pivotally hung, of a rock-shaft linked to said bed-carrying support and means for conveying blanks from said blank-supporting table to said gumming-bed, substantially as and for the purpose set forth.

2. The combination, with a gumming-bed and movable supports therefor, whereby said gumming-bed may be raised and lowered, of the horizontally-reciprocating slide-fingers 75, provided with abutment-lugs, upper and lower slide-strips 79 and 80, having abutment-gages, and the feed-in tapes 77 and 78, substantially as and for the purpose described.

3. The combination, with a gumming-bed and movable supports therefor, whereby said gumming-bed may be raised and lowered, of horizontally-reciprocating slide-fingers 75, provided with abutment-lugs, upper and lower slide-strips 79 and 80, having abutment-gages, the feed-in tapes 77 and 78, and one or more blank-adjusting dogs 103, mounted and adapted to have a horizontally-reciprocatory and a vertical tilting movement, substantially as and for the purpose described.

4. In combination, a gumming-bed having an aperture therein, a platen above said aperture, a vertically-moving type-carrying bed adapted to present the face of its type through said aperture, and a reciprocating gummer, the said gummer and type-bed being arranged for their reciprocatory movements in lines embraced within the area on said gumming-bed to be covered by the blank to be gummed and printed thereon, whereby such blank resting on said gumming-bed may be gummed and printed without being moved, substantially as described.

5. The combination, with a gumming-bed having an aperture 89 therein and automatic vertically-movable supporting means therefor, substantially as described, of a platen above said aperture and a vertically-movable type-carrying bed adapted to present the face of its type through said aperture, substantially as and for the purposes set forth.

6. The combination, with a gumming-bed and automatic vertically-movable supporting means therefor, substantially as described, a pneumatic picker and two pairs of slide-strips, each comprising upper and lower strips 79 80, provided with abutment-gages 90, and supporting and actuating means, substantially as described, whereby the upper strip of one pair may be automatically raised and lowered, of the reciprocating fingers 75, feed-in tapes 77 and 78, the reciprocating adjusting-dogs 103 and reciprocating gummers 44, a creasing-frame located toward the rear end of the machine from said gumming-bed and having adjusting-gages 276, upper and lower tapes for conveying blanks from said gumming-bed to said creasing-frame, one of said tapes being movably supported at its portion toward said gumming-bed, substantially as described, whereby it may be intermittently made to run in and out of contact with the adjacent portion of the other tape, and fingers 269, for adjusting the blanks upon the creasing-frame, substantially as described.

7. In an envelope-machine, the combination, with a bed formed and supported to sustain blanks thereon, with a portion thereof overlying one edge of the bed, and with blank-folding mechanism, of devices intermediate of said bed and said blank-folding mechanism and adapted to convey blanks from the former to the latter, consisting of the supporting-rolls 252 253 and the endless tape 255, supported thereon and running by a portion of its course over the position of said portion of the blank overlying the edge of the said bed, a roll 258, and a swinging arm, the center of oscillation of which is coincident with the axis of said roll 258, and a roll 259, carried by said arm, an endless tape carried on said rolls, and means, substantially as described, for securing a reciprocating swinging motion of said roll-carrying arm, whereby the portion of the endless tape carried thereon may be carried into and out of a position for engagement with the portion of a blank overlying the said bed, substantially as described.

8. The combination, with a gumming-bed and the supporting-arms 110 therefor, by one end pivoted to a fixed support, of a rock-shaft provided with one or more radial arms 113, linked to said arms, and having a radial arm 115, a cam 117, and a thrust-rod 116, operated thereby and engaged with said radial arm 115, substantially as and for the purpose described.

9. The combination, with a gumming-bed provided with an aperture 174, and having the supporting-arms 110, by one end pivoted to a fixed support, of a rock-shaft provided with one or more radial arms 113, linked to said arms, and having a radial arm 115, provided with a lateral stud 182, a cam 117, and a thrust-rod 116, having a spring-sustained angular pawl-lever 177 pivoted thereto, one end of which is hooked and adapted normally to support the said radial-arm pin, and the other arm of which is provided with a lateral stud 179, and a rock-shaft 170, provided with radial arms 172 175, the former having a downward extension in the plane of said gumming-bed aperture and the latter having a lateral abutment-extension, all adapted and arranged for operation substantially as and for the purpose described.

10. The combination, with the rock-shaft radial arm 145 and a shaft or arbor 67, of a loose collar thereon and a connecting-rod 146, secured by one end to said radial arm and by its other end pivoted to the side of said collar, a curved arm 148, pivoted by its one end to said collar and by its other fastened on the end of a spring, and so arranged that the spring strain on said arm may have a tendency to turn said collar in either direction, according as the pivotal point of said arm is at either side of the line of the spring, substantially as and for the purpose described.

11. The combination, with the gumming-bed having an aperture 89 therein, supported and vertically movable, substantially as described, of a reciprocating bridging-slide 150 and actuating means therefor, substantially as described, for projecting said slide forward to partially support a fed-in blank when the gumming-bed is lowered, substantially as described.

12. In combination, a horizontally-supported rock-shaft 84, having a pinion 155 and a spur-gear 153 thereon, a guide-shoe K, comprising a back plate 158, and perforated ear-pieces 159, loosely surrounding said shaft and embracing said pinion, a racked thrust-rod 156, guided in said shoe and meshing with said pinion, a cam 157 and spring for reciprocating said thrust-rod, and the horizontally-movable racked bridging-slide 150, all substantially as and for the purpose described.

13. The combination, with the upper slide-strip 79 of one set of slide-strips comprised in the devices for guiding the blanks to the gumming-bed, having a downwardly-extended abutment-gage 90 thereon and pivotally supported by its forward end, of a lever swinging from a fixed center of oscillation, as the shaft 84, and pivotally engaging by its forward end the rear end of said strip, a cam, and a rod 88, operated thereby and connected to said swinging lever, substantially as and for the purpose described.

14. The combination, with the table having an aperture 289 and a substantially solid immovable folding-bed at one side thereof, of a front-flap holder and a movable support therefor, whereby said folder and its support may be located in said aperture to perform its folding operation and then removed therefrom, leaving said aperture unobstructed for a forward and downward discharge through same of a folded envelope from the bed, substantially as described.

15. The combination, with the table having thereon an immovable folding-bed and provided with an opening in advance thereof, of a swinging frame 290 and means, substantially as described, for securing its oscillation, a hinged front-flap folder supported on and movable with said swinging frame, means, substantially as described, for opening and closing said flap-holder, and one or more discharging-fingers $z$ for moving a folded envelope forwardly and downwardly.

16. The combination, with the table having an aperture 289, and an immovable folding-bed at one side thereof, provided with vertical slots 311 therein, of one or more pivoted discharging-fingers $z$, normally disposed within said slots, and each having a hook 310 extending above and to the rear of said folding-bed, and having a radial arm and a cam and thrust-rod for operating said fingers, substantially as described.

17. The combination, with the apertured table and the immovable folding-bed, of the intermediately-pivoted frame 290, having one end 292 formed for an abutment-stop and its other normally supported in said aperture, and provided with a radial arm 296, the cam 301, swinging lever 298, and connecting-rod 297 for oscillating said frame, the hinged front-flap holder 288, supported on said frame, a swinging lever 303, connecting-rod 302 between same and said flap-holder, a cam 305, and rod 304, operated thereby and secured to said swinging lever 303, all substantially as shown, and for the purpose described.

18. The combination, with a frame T, substantially as described, comprising, essentially, a rear plate 352, having an aperture 363 therein, of the reciprocating pusher W, having the supporting-bar 336, a ratchet-wheel having a given number of teeth, a pallet-carrying arm 367, having an extension 370, and means for securing a regular reciprocating motion of said arm, a rocker-shaft 373, provided with a hooked radial arm 375, capable of being swung into engagement with the said extension 370 and a radial arm 374, a swinging radial arm 377, and means, substantially as described, for securing a reciprocatory movement thereof, a slotted connecting-rod 380 between said arms 377 and 375, a rock-shaft 360, having a feeler-finger 359 and a radial arm 361 thereon, and a connecting-rod 362 between radial arms 361 and 374, substantially as and for the purpose described.

19. The combination, with the stud 357 and the sleeve 356, having the shifter-blades movable thereon, and the spring 395, of the counter ratchet-wheel provided with the abutment 384, a rocker-shaft 386, provided with radial arms 385 and 387, and an angular lever by one arm engaged with said radial arm 387 and by its other with an extension of said sleeve, substantially as and for the purpose described.

20. The combination, with a frame T, substantially as described, comprising, essentially, a rear plate 352, having an aperture 363 therein, of the reciprocating pusher W, having the supporting-bar 336, a ratchet-wheel having a given number of teeth, a pallet-carrying arm 367, having an extension 370, and means for securing a regular reciprocating motion of said arm, a rocker-shaft 373, provided with a hooked radial arm 375, capable of being swung into engagement with the said extension 370, and a radial arm 374, a swinging radial arm 377, and means, substantially as described, for securing a reciprocatory movement thereof, a slotted connecting-rod 380 between said arms 377 and 375, a rock-shaft 360, having a feeler-finger 359 and a radial arm 361 thereon, and a connecting-rod 362 between radial arms 361 and 374, an abutment on said ratchet, a rocker-shaft 386, provided with radial arms 385 and 387, the shifter-blades and a sliding carrying-sleeve therefor, and an angular lever engaging said radial arm 387 and said shifter-sleeve, substantially as described.

CHAS. H. HEYWOOD.

Witnesses:
WM. S. BELLOWS,
W. G. MORSE.

It is hereby certified that Letters Patent No. 420,792, granted February 4, 1890, upon the application of Charles H. Heywood, of Springfield, Massachusetts, for an improvement in "Machines for Making and Printing Envelopes," was erroneously issued to the said Heywood as owner of said invention; that said Letters Patent should have been issued to P. P. *Kellogg & Co.*, of Springfield, Massachusetts, as sole owners of said patent, said P. P. Kellogg & Co. being assignees of the entire interest in said invention as shown by the assignment of record in this Office; and that the said Letters Patent should be read with this correction therein that the same may conform to the record of the case in the Patent Office.

Signed, countersigned, and sealed this 25th day of February, A. D. 1890.

[SEAL.]

CYRUS BUSSEY,
*Assistant Secretary of the Interior.*

Countersigned:

ROBERT J. FISHER,
*Acting Commissioner of Patents.*